C. O. ROGERS.
EGG TESTING AND SORTING MACHINE.
APPLICATION FILED MAR. 17, 1921.

1,394,445.

Patented Oct. 18, 1921.
6 SHEETS—SHEET 1.

Inventor
Charles O. Rogers
By Eugene C. Brown
Attorney

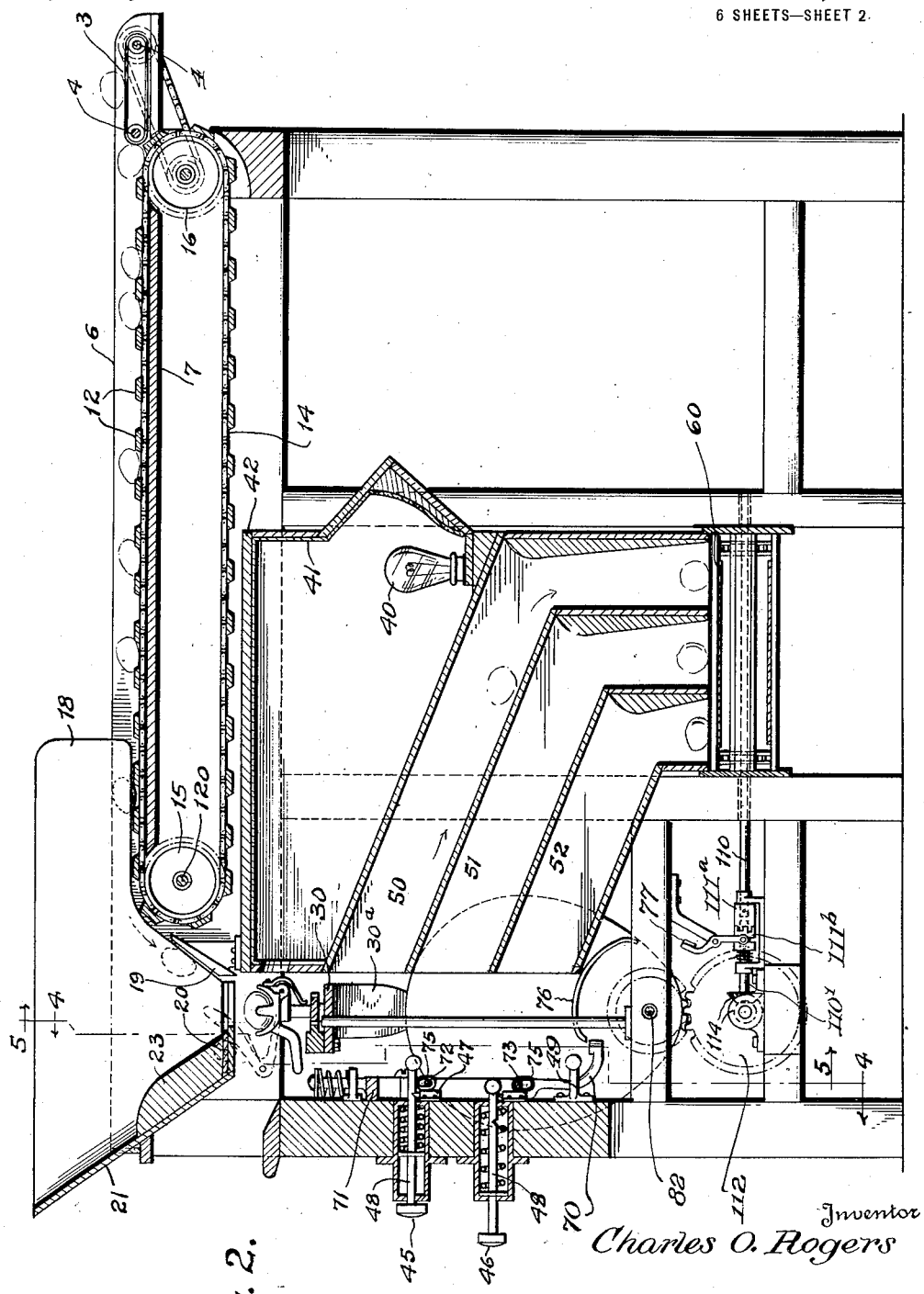

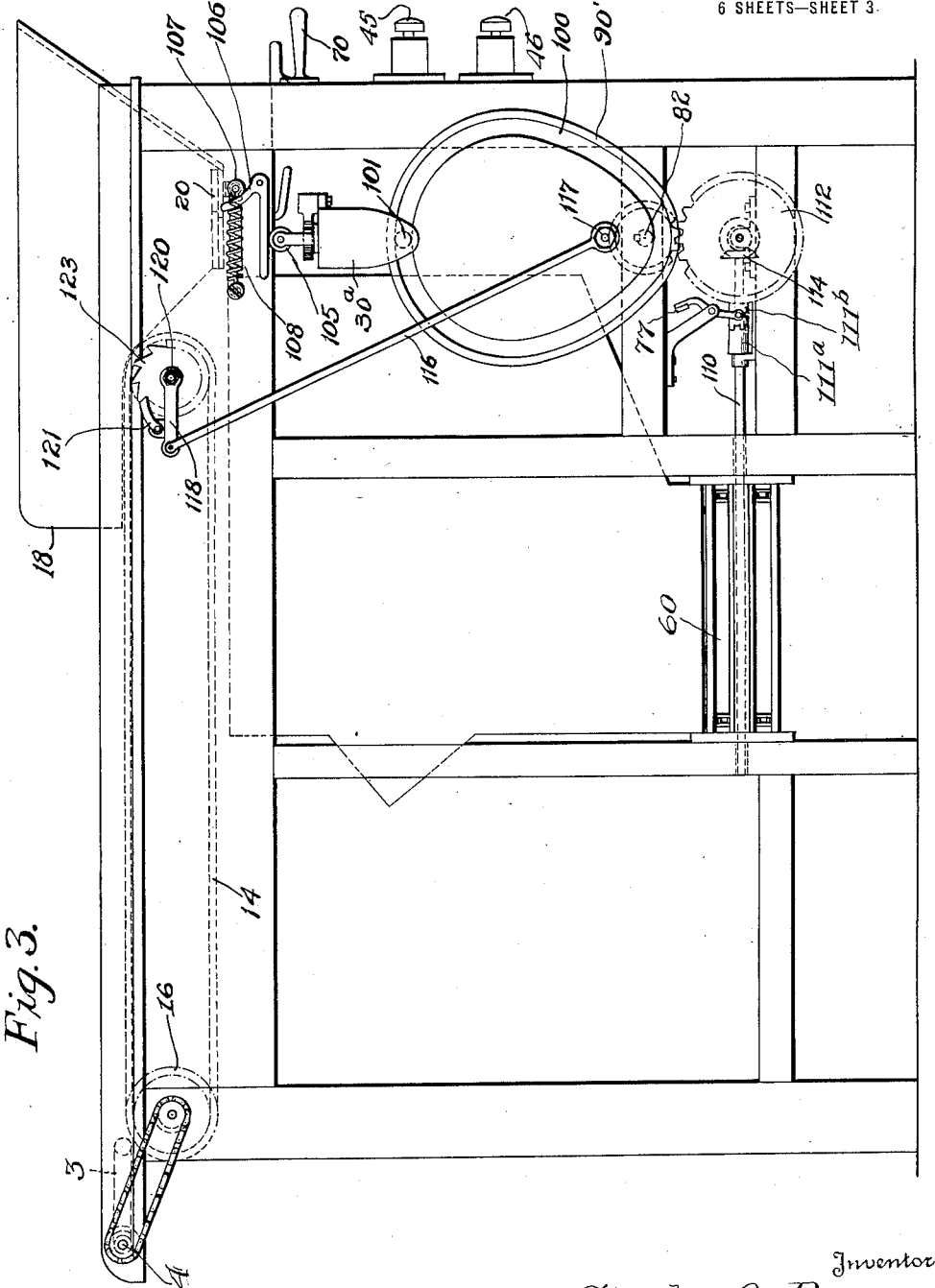

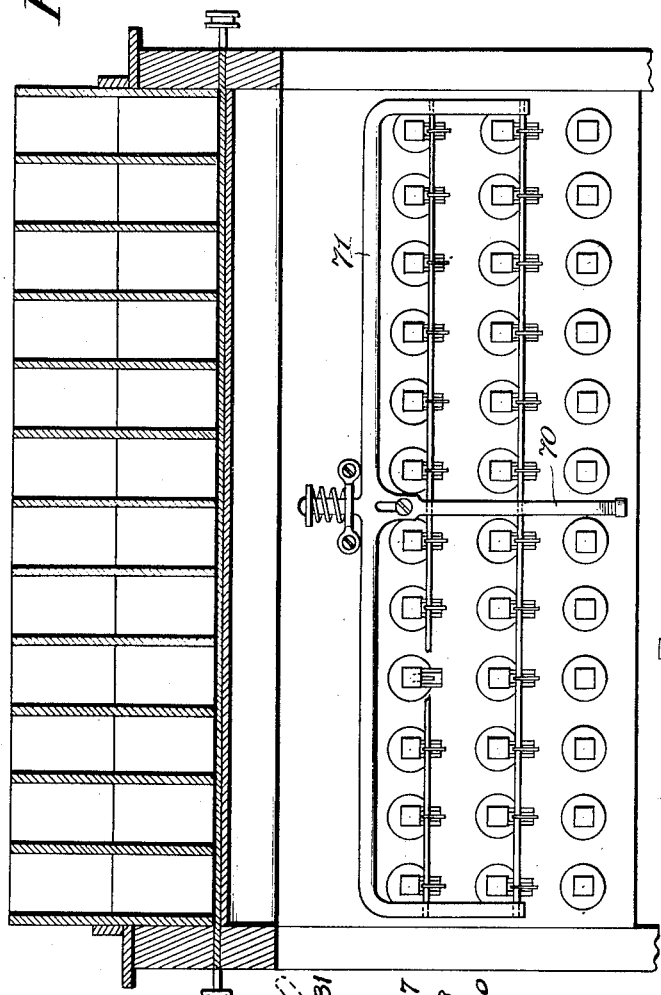
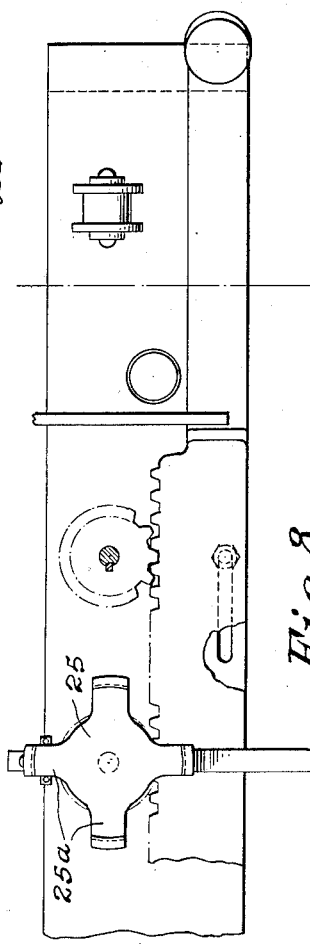
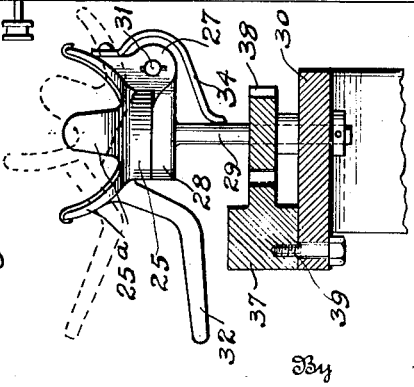

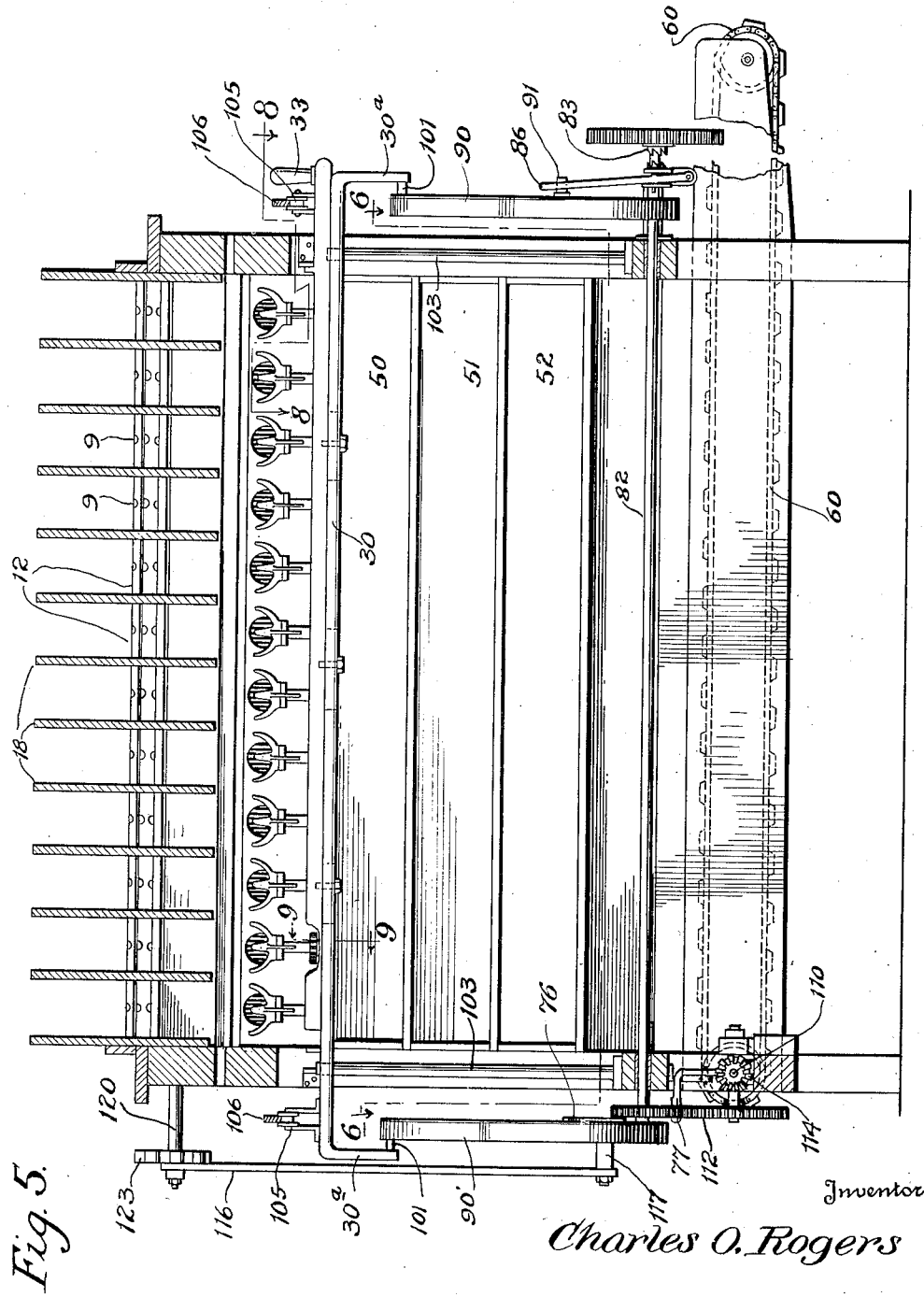

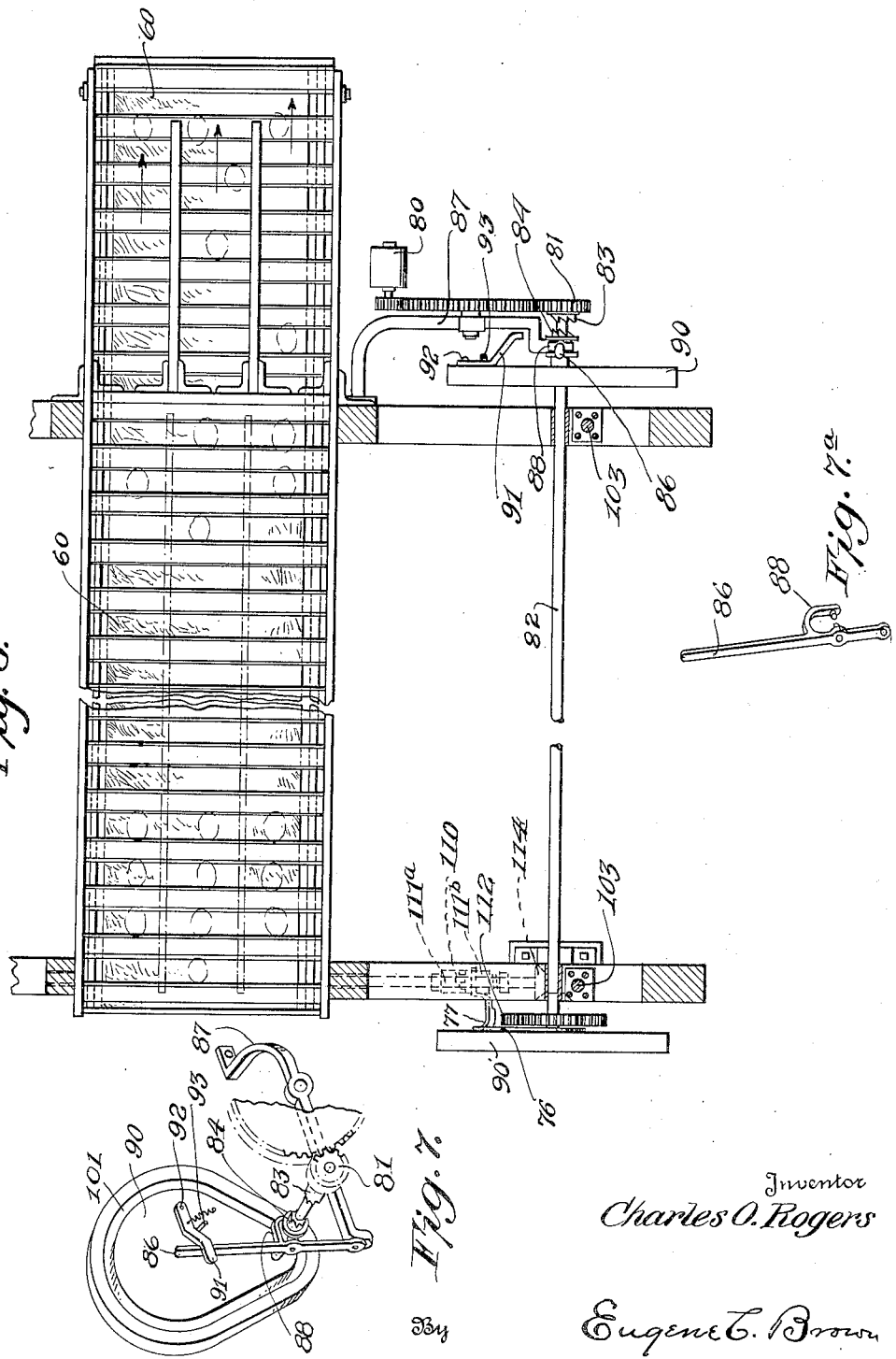

UNITED STATES PATENT OFFICE.

CHARLES O. ROGERS, OF WILLIAM PENN, PENNSYLVANIA.

EGG TESTING AND SORTING MACHINE.

1,394,445.

Specification of Letters Patent.   Patented Oct. 18, 1921.

Application filed March 17, 1921. Serial No. 453,058.

*To all whom it may concern:*

Be it known that I, CHARLES O. ROGERS, a citizen of the United States, residing at William Penn, in the county of Montgomery and State of Pennsylvania, have invented certain new and useful Improvements in Egg Testing and Sorting Machines, of which the following is a specification.

This invention relates to apparatus for subjecting eggs to a test of their quality by the well known light test and thereafter separating them into different grades.

The main purpose of my invention is to provide means for increasing the rapidity with which eggs may be handled in the assorting process and to facilitate the accurate inspection of each egg.

Figure 1:
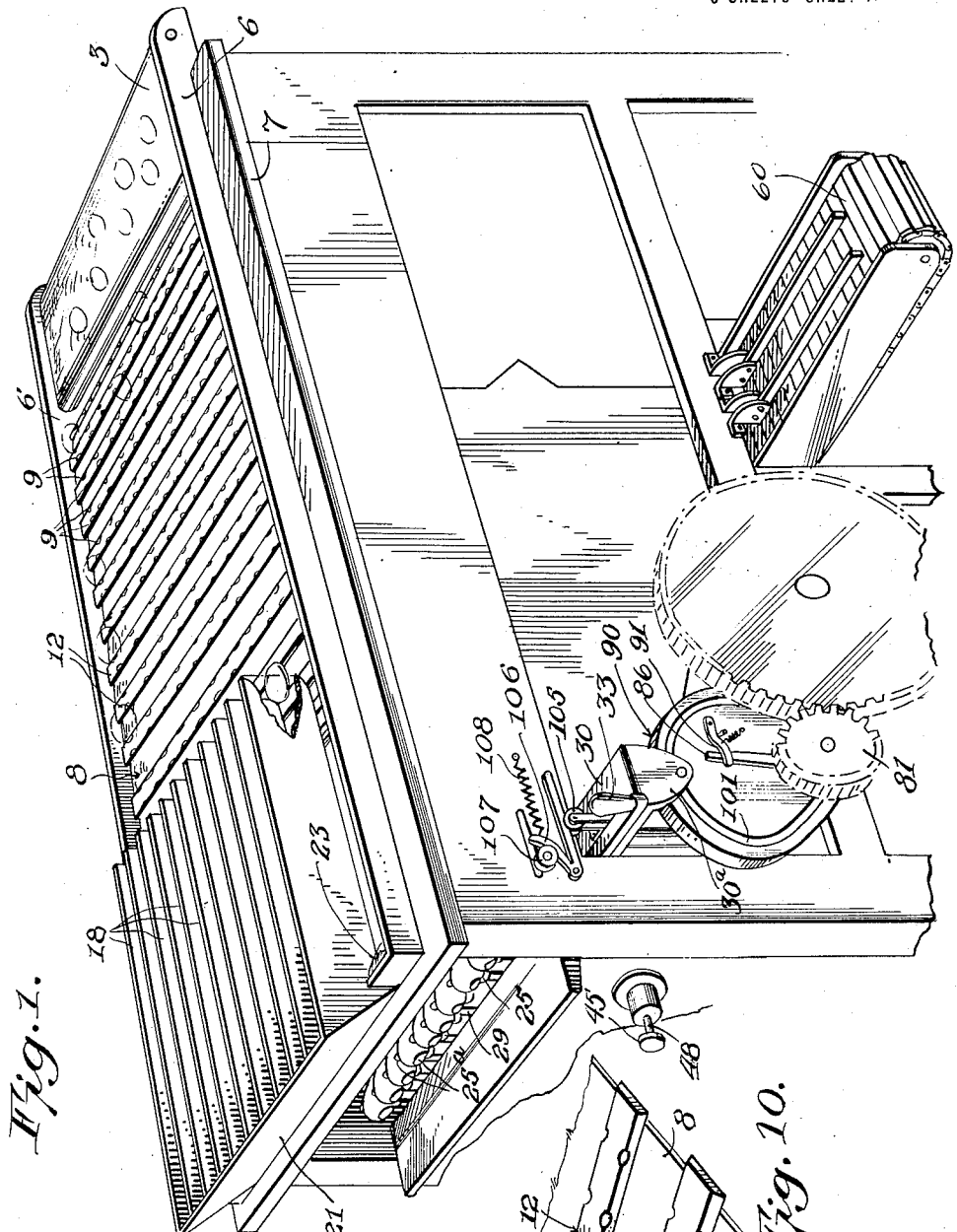
Figure 10:
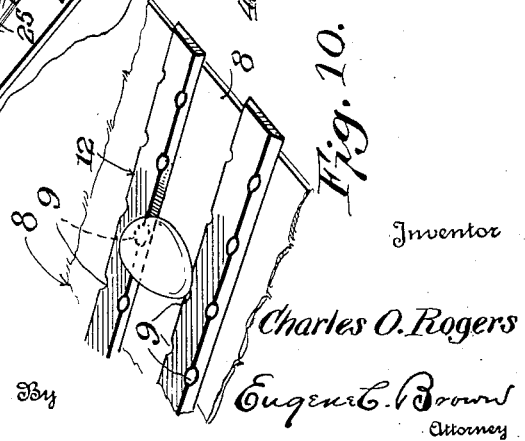

In disclosing my method and the preferred form of apparatus employed, I shall refer to the accompanying drawings in which:—Figure 1 is a perspective view of an apparatus embodying my invention; Fig. 2 is a longitudinal sectional view of the same; Fig. 3 is a side elevation viewed from the side opposite that of Fig. 1; Figs. 4 and 5 are vertical sectional views on the lines 4—4 and 5—5 respectively of Fig. 2; Fig. 6 is a horizontal sectional view on the line 6—6 of Fig. 5; Fig. 7 is a detail view of the clutch operating mechanism; Fig. 7ᵃ is a detail view of the clutch operating lever; Fig. 8 is an enlarged fragmentary sectional view on the staggered line 8—8 of Fig. 5; Fig. 9 is an enlarged detail view of one of the egg holders; and Fig. 10 is a fragmentary view of a slat in the egg conveyer.

The eggs are first laid upon the receiving belt 3, carried by pulleys 4, journaled in the upright side members 6 of the table 7 and pass onto the conveyer belt where they rest in shallow pockets formed by notches 9 in opposite slats 12. The slats are secured at the ends to sprocket chains 14 carried by the sprocket wheels 15 and 16. As the eggs approach the inner end of the conveyer, they pass between partition 18 and are guided over the inclined side 19 of a trough where they rest momentarily upon the slide 20. The front wall 21 of the trough is provided with a pad 23 to catch the eggs as they roll from the conveyer.

The individual egg cups or holders 25 are preferably of skeleton shape formed by a plurality of upwardly extruding arcuate fingers 25ᵃ, each holder being hinged at 27 to a support 28 provided with a depending stem 29 rotarily mounted in a vertically movable carrier 30. The holders may be tilted upon the pivot pins 31, into the dotted line position indicated in Fig. 9 to discharge the eggs, by engaging the projecting arm 32, the holder being returned to normal position by the spring 34. The holders may be oscillated through 180° by means of a rack bar 37 which engages pinions 38 carried by the stems 29, the bars being guided by pins 39 projecting upwardly from the carrier 30 and entering slots or grooves in the bars.

When the eggs are received by the holders 25, they are in the line of vision between the operator and the lamp 40. The lamp housing 41 is heat insulated by a covering 42 of asbestos or other suitable material. As each egg is inspected the operator presses the appropriate knob 45 or 46 which determines whether the egg shall be deposited in the first chute 50 for discarded eggs, chute 51 for first class eggs, or chute 52 for second class eggs, the eggs being guided by the lower padded ends of the chutes upon a fabric conveyer belt 60 by which they are carried to the receptacles for the assorted eggs. When a knob is pushed inwardly, a spring catch 47 enters a notch in the stem 48 and holds it in the position indicated by the stem of the knob 45 in Fig. 2, in which position it is in the path of the descending levers 32 and will tilt the corresponding holder, causing the egg to roll into chute 50. The stationary stems 49 are in a position to engage all of the levers and consequently all eggs which have not been deposited in chute 50 or 51 will be deposited in chuts 52.

Just before the carrier 30 reaches its lowermost position, its lower side strikes the projecting lower end of arm 70 which depends from a yoke bar 71, which carries transverse rods 72, 73, that pass through loops or rings 75 attached to the dogs of the spring catches 47. The stems are thereby released, permitting all of the stems 48 to be moved back simultaneously by their springs to normal position out of alinement with the levers 32.

Power is applied from any suitable motor 80, through suitable connections to a gear 81 loosely mounted upon shaft 82 and having a clutch face 83. The coöperating clutch member 84 is splined to the shaft and may be slid into or out of engagement by means of the lever 86 pivoted at its lower end to the bracket 87, and carrying a yoke 88 having pins which ride in a groove in the shifter collar of the clutch member 84. Secured to the shaft are cams 90, 90', the former carrying a laterally extending curved guide arm 91, pivoted at 92 and normally spring-held against a pin 93. The arm is positioned in the path of the lever 86 and at the instant the cam reaches its upper limit, the lever is moved laterally, thereby disengaging the clutch member 84 and thus stopping the cam shaft. When it is desired to again operate the cam shaft, the arm 91 is swung upwardly to free the lever 86 and the latter is then thrown over to clutching position.

The cams 90 and 90' are provided in their outer sides with grooves 100 adjacent their peripheries to receive pins 101 which project inwardly from the downwardly turned ends 30$^a$ of the carrier 30. It will be apparent that as the cams rotate from their uppermost position shown in Figs. 2, 3 and 5, the pull on the pins 101 will cause the gradual descent of the carrier 30 until the cams have traveled through 180°, when the carrier will be in its lowermost position. The carrier is guided in a vertical plane by the rods 103.

Just before the cams reach their upper limit, the roller brackets 105 at either end of the carrier strike the lower arm of the bell-crank lever 106, causing the other arm of the lever to engage the rollers 107 and shift the slide 20 to open position, thereby permitting the row of eggs resting thereon to drop into the egg holders 25. When the carrier starts downwardly the slide is moved back into closed position by the springs 108.

Power may be transmitted to the several parts of the machine from the cam shaft 82 in the manner indicated. The shaft 110 which carries the sprockets for the drive chains of the delivery conveyer 60 is actuated through gear 112 and bevel gears 114. The receiving belt 3 and sprockets 15 of the feeding conveyer are operated intermittently by the connecting rod 116 carried by the pin 117 on the cam 90', as indicated in Figs. 3 and 5. The upper outer end of the rod 116 is pivoted to the rock-arm 118 loosely mounted on the end of the shaft 120. The arm 118 carries a pivoted pawl 121 which rides over a ratchet wheel 123 fast on shaft 120. During the half revolution that the rod 116 is on the upstroke the pawl engages a tooth in the ratchet wheel and rotates the shaft 120, thereby causing a forward movement of the conveyer and belt, but as the rod 116 moves downward during the following half revolution, the pawl slides backwardly over the teeth of the ratchet wheel and no movement is communicated to the conveyer belt. The parts are so proportioned that each intermittent movement causes the conveyer to advance the distance between successive rows of eggs so that only one row of eggs is deposited on the slide 20 during each complete revolution of the cams.

The shaft 110 which carries the drive sprockets for the delivery belt 60 is connected to the shaft 110' by means of an interposed clutch, comprising a member 111$^a$ secured to the shaft 110 and a member 111$^b$ splined to the shaft 110' and spring pressed toward the member 111$^a$. The cam 90' carries a rib 76 which engages the lever 77 and slides the clutch member 111$^b$ out of engagement with the member 111$^a$ during the portion of the revolution in which the eggs are being deposited in the chutes 50, 51 and 52. The delivery conveyer belt 60 is thus stationary while the eggs are being deposited thereon but is actuated at other times.

The manner in which my invention is carried out will be apparent from the above detailed account of the parts of the machine. The machine is started in operation by engaging the clutch members. The eggs from the supply are laid upon the traveling receiving belt 3 which delivers them to the conveyer belt, the eggs resting in the pockets in the slats 12. When the first row of eggs has been deposited on the slide 20, they will fall into the egg holders 25 as the slide is withdrawn by the engagement of the roller brackets 105 with the bell-crank levers 106, the operation of the cams being then stopped by the shifting of lever 86 as it contacts with the arm 91. The operator now inspects the eggs as they are lighted by the lamp 40 and pushes the knobs 45 of those which are to be discarded. He then moves the handle 33 laterally to slide the rack 37 and cause the holders 25 to oscillate to reverse position, after which he again inspects the eggs and presses any knobs corresponding to additional eggs which are to be discarded and also presses the knobs 46 which correspond to eggs considered first class. After returning the handle 33 to normal position the operator swings the arm 91 and throws the lever 86 into clutching position, causing the cams 90, 90' to rotate and gradually move the carrier downward. When the carrier is opposite the chute 50, the rods 48 of the knobs 45 which were pressed inward will engage the corresponding levers 32, tilting the holders 25 and discharging the eggs. This operation will be repeated for the holders carrying first class eggs when the carrier is opposite chute 51; and finally when the carrier is opposite the chute 52 all of the holders will be tilted by the stationary stems 49 to discharge the eggs which were not included in the first two classes.

As the carrier approaches its lowermost limit, it strikes the arm 70, lowering the yoke 71 and releasing the spring catches 47, thereby permitting the tripping stems 48 to return to normal position.

During the descent of the carrier the clutch members 111ᵃ and 111ᵇ were disconnected by the engagement of the lever 77 with the rib 76 on the cam but as the lever 77 rides off the rib the clutch members automatically engage and the shaft 110 is driven through the gears 114 and actuates the conveyer belt 60 to deliver the assorted eggs to the receptacles which receive the graded lots.

As the cams move upwardly, the connecting rod 116 operates through the pawl 121 to move the conveyer forward and thereby deposit another set of eggs upon the slide 20 ready to be dropped into the egg holders when the cams have reached the uppermost limit of travel.

The several steps in the operation above described take place in quick succession so that the process of inspecting and assorting is carried out with great rapidity. By reason of the reversal of the eggs while they are being light tested, the inspection is very thorough and the quality of the eggs is determined with accuracy.

I have described in detail the particular construction illustrated in the accompanying drawings, but it will be evident that various structural changes and modifications can be made without departing from my invention.

I claim:

1. An egg testing and sorting apparatus, comprising means for progressively feeding a plurality of eggs, inspection holders adapted to receive the eggs, means for turning the eggs while in said inspection holders and manually controlled means for causing the eggs to be discharged into different predetermined channels.

2. An egg testing and sorting apparatus, comprising means for progressively feeding a plurality of eggs, inspection holders adapted to receive the eggs, and manually controlled means for causing the eggs to be discharged into different predetermined channels.

3. An egg testing and sorting apparatus, comprising means for intermittently feeding a plurality of eggs into inspection holders, means for turning the eggs while in inspection position, and manually controlled means for causing certain of the eggs to be discharged while the remainder are conveyed to another location.

4. An egg testing and sorting apparatus, comprising means for progressively feeding a plurality of eggs, inspection holders adapted to receive the eggs, means for turning the eggs while in said inspection holders, and manually controlled means for causing the eggs to be discharged successively into separate predetermined channels.

5. An egg testing and sorting apparatus, comprising an intermittently moving conveyer arranged to deliver successive lots of eggs into egg holders, means for simultaneously turning said holders into different positions within the range of inspection, manually controlled tripping devices adapted to be moved into the path of said holders, and means for moving said holders past said devices to cause the tilting of the holders in accordance with the predetermined setting of said tripping devices.

6. In an egg testing and sorting apparatus as set forth in claim 5, and means for automatically returning the tripping devices to normal position at the end of each operation.

In testimony whereof I affix my signature.

CHARLES O. ROGERS.